(12) United States Patent
Carlson et al.

(10) Patent No.: US 8,213,955 B2
(45) Date of Patent: Jul. 3, 2012

(54) NETWORK MEASUREMENT REPORT CACHING FOR LOCATION OF MOBILE DEVICES

(75) Inventors: John P. Carlson, Dulles, VA (US); Martin Dawson, Wollongong (AU)

(73) Assignee: Andrew, LLC, Hickory, NC (US)

( * ) Notice: Subject to any disclaimer, the term of this patent is extended or adjusted under 35 U.S.C. 154(b) by 1098 days.

(21) Appl. No.: 12/113,476

(22) Filed: May 1, 2008

(65) Prior Publication Data

US 2009/0275344 A1    Nov. 5, 2009

(51) Int. Cl.
*H04W 24/00* (2009.01)
*H04M 11/04* (2006.01)
*H04L 7/00* (2006.01)
*G01S 19/00* (2010.01)
*G06F 15/16* (2006.01)

(52) U.S. Cl. ............... 455/456.1; 455/404.2; 455/456.5; 375/357; 342/357.2; 709/230

(58) Field of Classification Search ................ 455/456.1
See application file for complete search history.

(56) References Cited

U.S. PATENT DOCUMENTS

| | | |
|---|---|---|
| 3,150,372 A | 9/1964 | Groth, Jr. |
| 3,659,085 A | 4/1972 | Potter et al. |
| 4,728,959 A | 3/1988 | Maloney |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,245,634 A | 9/1993 | Averbuch |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |

(Continued)

FOREIGN PATENT DOCUMENTS

JP    06-347529    12/1994

(Continued)

OTHER PUBLICATIONS

Y. Zhao, "Standardization of Mobile Phone Positioning for 3G Systems," IEEE Communications Magazine, Jul. 2002, pp. 108-116.

(Continued)

*Primary Examiner* — Dwayne Bost
*Assistant Examiner* — Timothy Pham
(74) *Attorney, Agent, or Firm* — Duane Morris, LLP

(57) ABSTRACT

A system and method for determining an approximate location of a mobile device. The occurrence of a predetermined event may be determined at a first node of a network. Measurement data associated with the mobile device may be stored at a second node of the network. An attempt may be made to determine a location of the mobile device using a first location methodology. Upon failure of the location attempt, the mobile device data may be received at a third node of the network from the second node. At the third node an approximate location of the mobile device may be determined using the mobile device data.

38 Claims, 3 Drawing Sheets

U.S. PATENT DOCUMENTS

| | | |
|---|---|---|
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,959 A | 8/2000 | Yost |
| 6,101,178 A | 8/2000 | Beal |
| 6,108,555 A | 8/2000 | Maloney et al. |
| 6,115,599 A | 9/2000 | Stilp |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,400,320 B1 | 6/2002 | Stilp et al. |
| 6,407,703 B1 | 6/2002 | Minter et al. |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,167,713 B2 | 1/2007 | Anderson |
| 7,271,765 B2 | 9/2007 | Stilp et al. |
| 7,340,259 B2 | 3/2008 | Maloney |
| 7,427,952 B2 | 9/2008 | Bull et al. |
| 7,440,762 B2 | 10/2008 | Maloney et al. |
| 7,593,738 B2 | 9/2009 | Anderson |
| 2002/0172223 A1 | 11/2002 | Stilp et al. |
| 2002/0175855 A1 | 11/2002 | Richton et al. |
| 2003/0064734 A1 | 4/2003 | Stilp et al. |
| 2003/0134646 A1* | 7/2003 | Forrester ..................... 455/456 |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy, Jr. et al. |
| 2004/0132466 A1 | 7/2004 | Kennedy, Jr. et al. |
| 2004/0192346 A1* | 9/2004 | Chang et al. ............ 455/456.1 |
| 2004/0198386 A1 | 10/2004 | Dupray |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0066044 A1 | 3/2005 | Chaskar et al. |
| 2005/0136945 A1 | 6/2005 | Kennedy, Jr. et al. |
| 2005/0159170 A1 | 7/2005 | Puranik et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0014517 A1 | 1/2006 | Barclay et al. |
| 2006/0028338 A1 | 2/2006 | Krishan et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2007/0042790 A1 | 2/2007 | Mohi et al. |
| 2007/0072583 A1 | 3/2007 | Barbeau et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |

FOREIGN PATENT DOCUMENTS

| | | |
|---|---|---|
| WO | 2006088472 A1 | 8/2006 |

OTHER PUBLICATIONS

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking", IEEE Transactions on Signal Processing, vol. 43, No. 1, Jan. 1995, pp. 95-107.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

* cited by examiner

NETWORK MEASUREMENT REPORT CACHING FOR LOCATION OF MOBILE DEVICES

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, the United States Federal Communications Commission ("FCC") has required that cellular handsets must be geographically locatable by the year 2001. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. For example, providers of wireless communication services may have installed mobile device location capabilities into their networks. In operation, these network overlay location systems take measurements on radio frequency ("RF") transmissions from mobile devices at base station locations surrounding the mobile device and estimate the location of the mobile device with respect to the base stations. Because the geographic location of the base stations is known, the determination of the location of the mobile device with respect to the base station permits the geographic location of the mobile device to be determined. The RF measurements of the transmitted signal at the base stations may include the time of arrival, the angle of arrival, the signal power, or the unique/repeatable radio propagation path (radio fingerprinting) derivable features. In addition, these location systems may also use collateral information, e.g., information other than that derived for the RF measurement to assist in the geographic location ("geolocation") of the mobile device, i.e., location of roads, dead-reckoning, topography, map matching, etc.

In a network-based geolocation system, the mobile device to be located may be typically identified and radio channel assignments determined by (a) monitoring the control information transmitted on radio channel for telephone calls being placed by the mobile device or on a wireline interface to detect calls of interest, i.e., 911, and/or (b) a location request provided by a non-mobile device source, i.e., an enhanced services provider. Once a mobile device to be located has been identified and radio channel assignments determined, a location determining system is first tasked to determine the geolocation of the mobile device and then directed to report the determined position to the requesting entity or enhanced services provider. The monitoring of the RF transmissions from the mobile device or wireline interfaces to identify calls of interest is known as "tipping", and generally involves recognizing a call of interest being made from a mobile device and collecting the call setup information. Once the mobile device is identified and the call setup information is collected, the location determining system can be tasked to geolocate the mobile device.

In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information. With GPS, signals from a constellation of satellites arrive at a GPS receiver and are utilized to determine the position of the receiver. GPS position determination is made based on the time of arrival ("TOA") of various satellite signals. Each of the orbiting GPS satellites broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time.

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, elevation and receiver clock offset. The amount b, by which the processor has added or subtracted time, is the instantaneous bias between the receiver clock and the satellite clock. It is possible to calculate a location with only three satellites when additional information is available. For example, if the elevation of the handset or mobile device is well known, then an arbitrary satellite measurement may be included that is centered at the center of the earth and possesses a range defined as the distance from the center of the earth to the known elevation of the handset or mobile device. The elevation of the handset may be known from another sensor or from information from the cell location in the case where the handset is in a cellular network.

Traditionally, satellite coordinates and velocity have been computed inside the GPS receiver. The receiver obtains satellite ephemeris and clock correction data by demodulating the satellite broadcast message stream. The satellite transmission contains more than 400 bits of data transmitted at 50 bits per second. The constants contained in the ephemeris data coincide with Kepler orbit constants requiring many mathematical operations to turn the data into position and velocity data for each satellite. In one implementation, this conversion requires 90 multiplies, 58 adds and 21 transcendental function cells (sin, cos, tan) in order to translate the ephemeris into a satellite position and velocity vector at a single point, for one satellite. Most of the computations require double precision, floating point processing.

Thus, the computational load for performing the traditional calculation is significant. The mobile device must include a high-level processor capable of the necessary calculations, and such processors are relatively expensive and consume large amounts of power. Portable devices for consumer use, e.g., a cellular phone or comparable device, are preferably inexpensive and operate at very low power. These design goals are inconsistent with the high computational load required for GPS processing.

Further, the slow data rate from the GPS satellites is a limitation. GPS acquisition at a GPS receiver may take many seconds or several minutes, during which time the receiver circuit and processor of the mobile device must be continuously energized. Preferably, to maintain battery life in portable receivers and transceivers such as mobile cellular handsets, circuits are de-energized as much as possible. The long GPS acquisition time can rapidly deplete the battery of a mobile device. In any situation and particularly in emergency situations, the long GPS acquisition time is inconvenient.

Assisted-GPS ("A-GPS") has gained significant popularity recently in light of stringent time to first fix ("TTFF"), i.e., first position determination, and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network) including receivers with clear views of the sky that may operate continuously. This reference network may also be connected with the cellular infrastructure, may continuously monitor the real-time constellation status, and may provide data for each satellite at a particular epoch time. For example, the reference network may provide the ephemeris and the other broadcast information to the cellular infrastructure. In the case of D-GPS, the reference network may provide corrections that can be applied to the pseudoranges within a particular vicinity. As one skilled in the art would recognize, the GPS reference receiver and its server (or position determining entity) may be located at any surveyed location with an open view of the sky.

However, the signal received from each of the satellites may not necessarily result in an accurate position estimation of the handset or mobile device. The quality of a position estimate largely depends upon two factors: satellite geometry, particularly, the number of satellites in view and their spatial distribution relative to the user, and the quality of the measurements obtained from satellite signals. For example, the larger the number of satellites in view and the greater the distances therebetween, the better the geometry of the satellite constellation. Further, the quality of measurements may be affected by errors in the predicted ephemeris of the satellites, instabilities in the satellite and receiver clocks, ionospheric and tropospheric propagation delays, multipath, receiver noise and RF interference. Therefore, the improvements offered by A-GPS do not guarantee location in all environments; rather, A-GPS merely offers an improvement over conventional GPS.

The aforementioned shortcomings of the prior art has led the industry to pursue alternative location methods as a backup solution for a primary location methodology such as, but not limited to, A-GPS. One such method may generally be referred to as Network Measurement Report ("NMR") location methods. This particular location methodology generally attempts to locate mobile devices based on the normal network measurements made by the handset that are periodically provided back to the network. One characteristic when utilizing NMRs for location of a mobile device is that typically a large amount of data must be provided to Position Determining Equipment ("PDE") to produce a location estimate with satisfactory accuracy. In the event that many wireless subscribers are being located, the volume of data passed from the communications network to the PDE may be very large and unmanageable.

There are several methods to communicate the NMR back to the PDE from the network. One non-limiting method may be through the existing communication links established between base transceiver stations ("BTS") or base stations and a Serving Mobile Location Center ("SMLC") that serve as a path for information transfer for A-GPS positioning. FIG. 1 is an illustration of an exemplary architectural diagram for a communications system. A mobile station or mobile device 101 may be in communication with a BTS 105 via a wireless interface Um. The base station controller ("BSC") 107 manages radio resources including the BTS 105 via an Abis interface. The Abis interface is generally an open interface defined as part of the ETSI specification for GSM and carries call set up information, including voice channel assignments between the BSC 107 and BTS 105. A Mobile switching center/visitor location register ("MSC/VLR") 113 may coordinate between the mobile appliance communication network and a global mobile location center ("GMLC") 117. In operation, one or more location measurement units ("LMUs") 103 may be operably connected to a PDE 121 or BTS 105 which may also be operably connected to the BSC 107 via the Abis wire line interface. The LMUs 103 may make measurements on the RF signals of the Um interface, along with other measurements to support one or more of the positioning methods well known in the art. The measurements from the LMUs may be provided to a servicing mobile location center ("SMLC") 109 via the BSC 107 where the location of the mobile device 101 may be determined. The SMLC 109 may also be operably connected to the MSC/VLR 113 via an Ls interface. The GMLC 117 may be connected to a home location register ("HLR") 111 over an Lh interface and the MSC/VLR 113 over an Lg interface. Of course, the GMLC 117 may be operably connected to a location based services ("LBS") network 119 over an Le interface. A global mobile switching center ("GMSC") 115 may also be operably connected to the MSC/VLR 113.

In a GSM or Integrated Digital Enhanced Network ("IDEN") network, exemplary communication links that establish a path from the BSC 107 to the SMLC 109 are the "A" and "Ls" interfaces. These interfaces generally carry digital traffic over an SS7 connection which may be physically carried by some number of T1 style communication links in the underlying wired telecommunications network. In the event that NMR location is needed for a wireless provider, there may potentially be a substantial increase in the amount of data that the A and Ls interfaces must support. While expansion of the capacity of these interfaces is an option for resolving the problem, this may be a very expensive solution for a wireless carrier to support, given that the solution may require a significant nationwide capacity increase. Therefore, there is a need in the art to implement alternative communication methods for which NMR location could be supported in a wireless network that would not substantially increase implementation and operational costs.

Further, there is a need to provide a process to efficiently and effectively handle the vast amount of data being sent between a wireless communications network and the large number of mobile devices for which locations are to be determined. In this regard, embodiments of the present subject matter can overcome the limitations of the prior art by estimating the location of a mobile device using, at least in part, one or more Network Measurement Reports ("NMRs") which may include measurement data for a number of locations within a geographic region.

Accordingly, there is a need for a method and apparatus for determining the location of a mobile device that would overcome the deficiencies of the prior art. Therefore, an embodiment of the present subject matter provides a method for determining an approximate location of a mobile device. The method may comprise the steps of determining at a first node of a network the occurrence of a predetermined event and storing at a second node of the network measurement data associated with the mobile device. One or more attempts may be made to determine a location of the mobile device using a first location methodology. Upon failure of the location attempt, mobile device data may be received at a third node of the network from the second node. An approximate location of the mobile device using the mobile device data may then be determined at the third node. In another embodiment of the present subject matter, the method may comprise sending the determined approximate location to a fourth node of the network.

Another embodiment of the present subject matter provides a system for determining an approximate location of a mobile device. The system may comprise circuitry for determining at a first node of a network the occurrence of a predetermined event, and a database at a second node of the network for storing data associated with the mobile device. The system may also comprise a processor for attempting to determine a location of the mobile device, and a receiver at a third node of the network for receiving the mobile device data from the second node upon failure of the location attempt. The system may include circuitry for determining at the third node an approximate location of the mobile device using the mobile device data. In another embodiment of the present subject matter the system may further comprise circuitry for sending the determined approximate location to a fourth node of the network.

DETAILED DESCRIPTION

Figure 1:
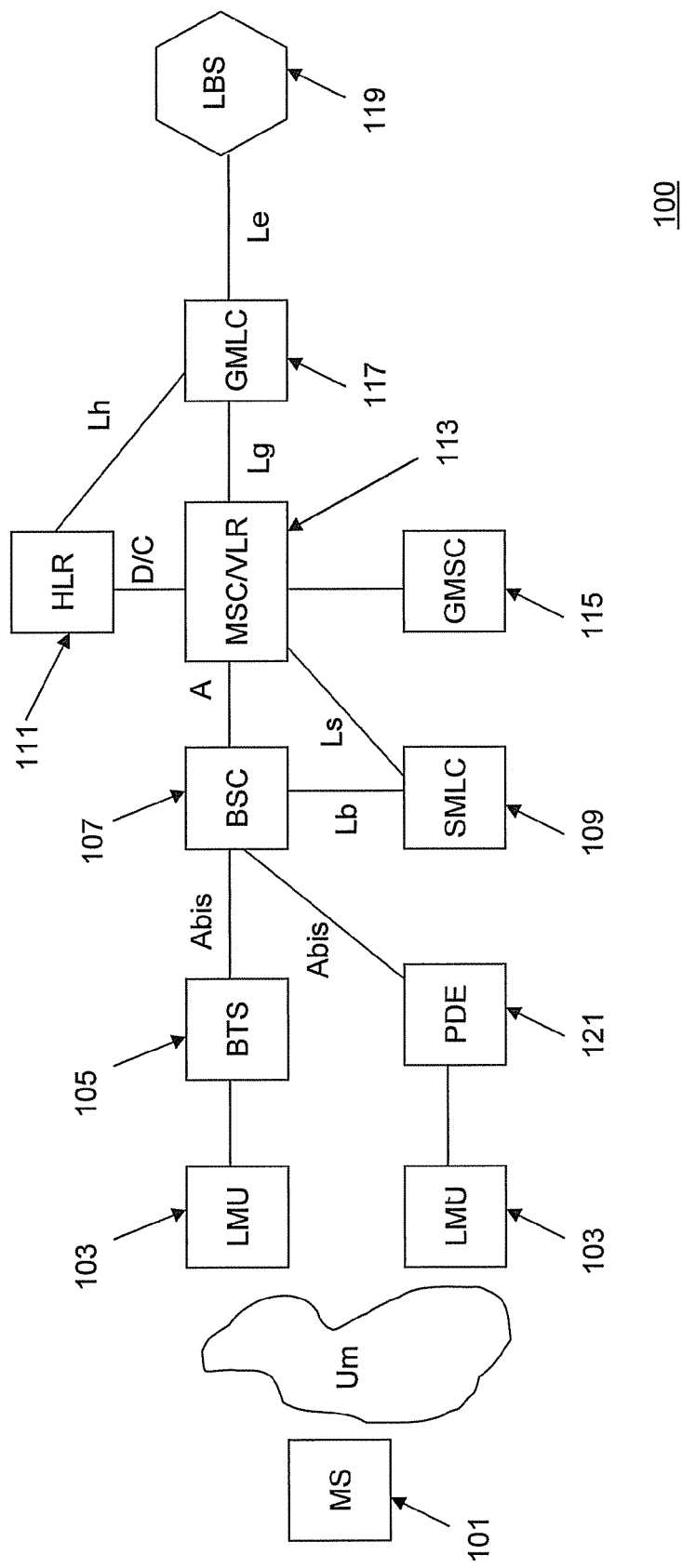
FIG. 1 is an illustration of an exemplary architectural diagram for a communications system.

With reference to the figures where like elements have been given like numerical designations to facilitate an understanding of the present subject matter, the various embodiments of a system and method for network measurement report caching for location of a mobile device are herein described.

While the following description references the Global Positioning System ("GPS"), this in no way should be interpreted as limiting the scope of the claims appended herewith. As is known to those of skill in the art, other GNSS systems operate, for the purposes of this disclosure, similarly to the GPS system, such as, but not limited to, the European Satellite project, Galileo; the Russian satellite navigation system, GLONASS; the Japanese Quasi-Zenith Satellite System ("QZSS"); and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above.

Generally wireless A-GPS devices or handsets have a low time to first fix ("TTFF") as the devices are supplied with assistance data from an exemplary communications network to assist in locking onto or acquiring satellites quickly. Exemplary network elements that supply the assistance data may be a Mobile Location Center ("MLC") or other comparable network element. Typical A-GPS information may include data for determining a GPS receiver's approximate position, time synchronization mark, satellite ephemerides, and satellite dopplers. Different A-GPS services may omit some of these parameters; however, another component of the supplied information is the identification of the satellites for which a device or GPS receiver should search. The MLC generally determines this information utilizing an approximate location of the device. Conventionally, this approximate location may be the location of the cell tower serving the device or another location such as, but not limited to, the boundary of the network, a city, county, state, country, continent, etc. The MLC may then supply the device with the appropriate A-GPS assistance data for the set of satellites in view from this conventional location.

The system and/or method of the present subject matter may also generally refer to a Network Measurement Report ("NMR") that may contain measurement data or calibration data obtained using various known methods. For example, the measurement data or calibration data may be obtained at each of several calibration points, which may be discrete points within a region each having geographical coordinates (e.g., latitude and longitude) associated therewith. Exemplary data may include, but are not limited to: (a) signal strengths observed for signals transmitted by a set of transmitters of known location within or in proximity to a region R; (b) signal strength of a transmitter located at the calibration point as measured by a set of receivers of known location within or in proximity to the region R; (c) round trip time for a signal between the calibration point and an external known point; (d) time difference of arrival at the calibration point with respect pairs of external points located within or in proximity to the region R as measured by either a receiver at the calibration point or the external points; (e) the serving cell or sector for a mobile wireless device operating at that calibration point; (f) the network state at the time of collection (e.g., a finite number of such states may be required to distinguish between network conditions that vary diurnally, weekly or in some other manner); and (g) combinations of the above.

As a non-limiting example, the case in (a) may apply to the Integrated Digital Enhanced Network ("IDEN") specification, (c) may apply to the Global System for Mobile communications ("GSM") specification as in the Timing Advance ("TA") parameter or the Round Trip Time ("RTT") parameter in the Universal Mobile Telecommunications System ("UMTS") specification, and/or (d) may apply to the UMTS specification, while the external receivers may be the base stations. Of course, these examples should not in any way limit the scope of the claims appended herewith. Generally, the measurement or calibration data may be any of those measurements made by a mobile wireless device or any measurement made on the transmissions or characteristics of the mobile wireless device at a set of external transmitter/receivers in the region R or in proximity thereto.

Embodiments of the present subject matter may also find applicability as a fallback location method or system to another primary location means for locating a mobile device. By way of a non-limiting example, an exemplary wireless network may rely upon an A-GPS technique for its primary positioning technology. As a result of the occasional failures of A-GPS being able to locate a mobile device in challenging RF environments, NMR location may be a suitable backup method. Embodiments of the present subject matter may thus provide a novel mechanism for which NMR data would be collected by the network that guarantees availability of the secondary NMR location estimate if needed, yet having a slight impact upon the underlying communications bandwidths within the exemplary network.

In one embodiment of the present subject matter and with continued reference to FIG. 1, a base station controller ("BSC") 107 may, upon detecting that an emergency call has been made, begin to locally cache or store NMR data associated with a target mobile device 101. NMR data may be retrieved from the target mobile device 101 at a configurable, periodic or random rate, and may be stored within the BSC 107 memory or database for a configurable period of time (e.g., 30 seconds, 1 minute, less than or greater than one minute, etc.). The respective servicing mobile location center ("SMLC") 109 may then be requested to perform a location of the target mobile device 101 and may initiate a procedure to locate the mobile device 101. In one embodiment of the present subject matter, the SMLC 109 may initially attempt to locate the mobile device 101 placing the emergency call through a primary location means, such as, but not limited to, A-GPS. In another embodiment of the present subject matter, subsequent location attempts may also be conducted.

In the event that the primary location method fails to produce a location in the required time, a secondary location method would be invoked. In one embodiment of the present subject matter the secondary location method may be concurrently invoked with the initial location attempt using the first location methodology or with subsequent location attempts. Of course, the number of attempts to locate the device using the first location methodology may be configurable. Further, subsequent location attempts may utilize any one of, combinations of, or hybrid location methodologies well known in the art, and such subsequent location attempts may use the same or different location methodologies as utilized in the initial location attempt. Exemplary embodiments of the present subject matter may implement the secondary location method by having the SMLC 109 request the BSC 107 to send cached NMR data to the SMLC 109. The SMLC 109, upon receiving the NMR data, may then generate a backup location estimate and pass the estimate to the network entity initiating the location request. Of course, many variations of the aforementioned process may be implemented that would provide the ability to cache the NMR data inside the core communications network until the SMLC 109, or a positioning determining entity ("PDE") 121, requires the NMR data to be sent. As a result, the NMR data stored in the respective network may be provided to the SMLC 109 or PDE 121 in the event that a primary location mechanism fails to thereby minimize traffic loading on the communications path between the core network and the SMLC 109 or PDE 121. Of course, the NMR caching function may be stored in other network elements such as the Mobile Switching Center ("MSC") 113 or the base transceiver stations ("BTS") 105, and the example provided above should not limit the scope of the claims appended herewith.

Figure 2:
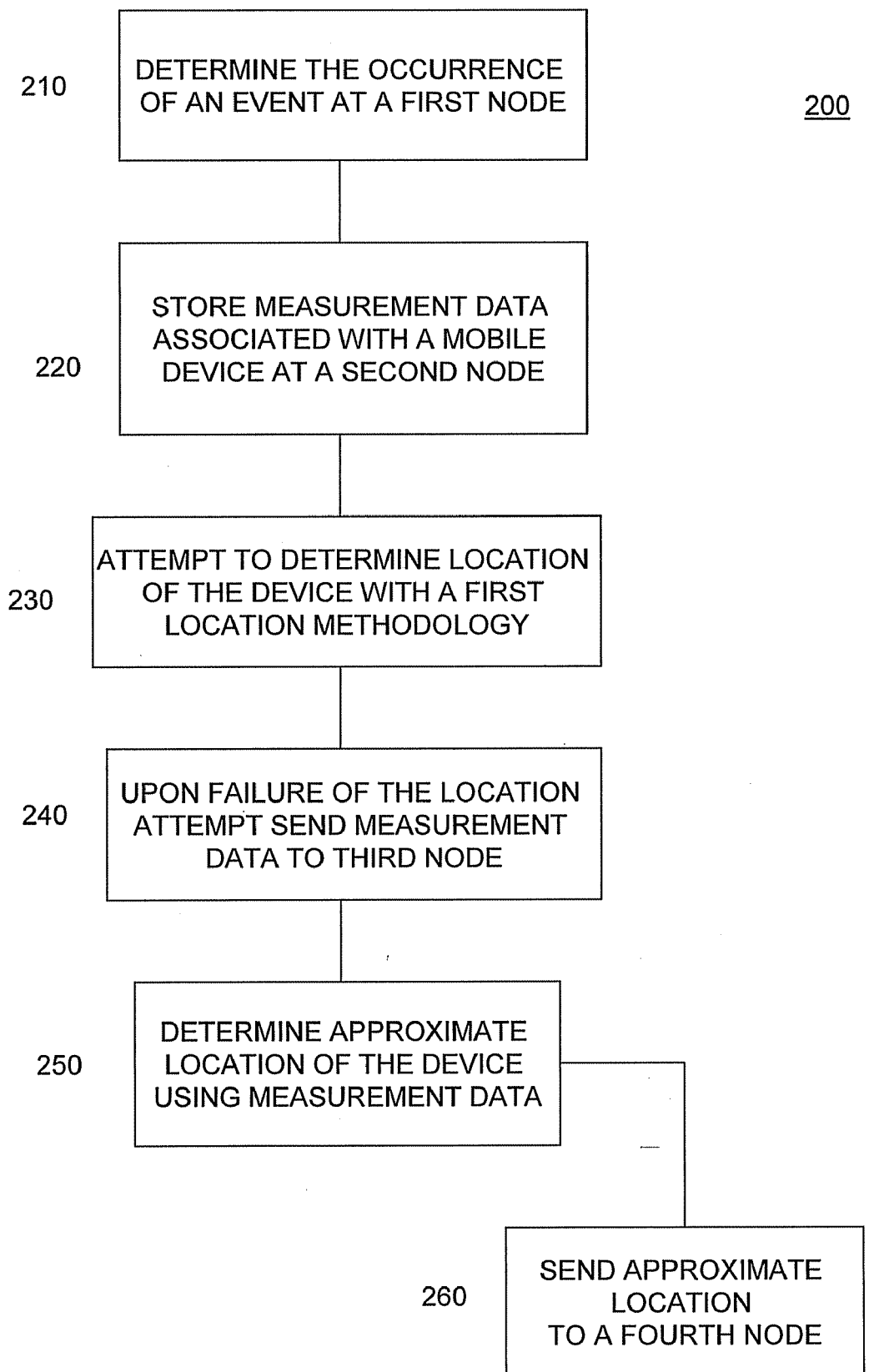
FIG. 2 is an algorithm according to one embodiment of the present subject matter.

FIG. 2 is an algorithm according to one embodiment of the present subject matter. With reference to FIG. 2, a method for determining the location of a wireless device 200 is provided. At step 210, the occurrence of a predetermined event may be determined at a first node of a communications network. An exemplary communications network may be, but is not limited to, a wireless communication network such as a GSM network, iDEN, Worldwide Interoperability for Microwave Access ("WiMAX") Network, UMTS Network, Code Division Multiple Access ("CDMA") 2000 Network, WiFi Network, and Long Term Evolution ("LTE") Network. An exemplary first node may be, but is not limited to, a BSC, BTS, MSC, SMLC, PDE, and combinations thereof. An exemplary predetermined event may be, but is not limited to, an emergency call, a 911 call, a request for location of the mobile device, and combinations thereof.

At step 220, measurement data associated with the mobile device may be stored at a second node of the network. An exemplary second node may be, but is not limited to, a BSC, BTS, MSC, SMLC, PDE, and combinations thereof. In one embodiment of the present subject matter, the first and second nodes may be the same. Exemplary data may include, by way of a non-limiting example, NMR information. By way of a further example, exemplary measurement data associated with the mobile may include signal strength for a signal transmitted by a transmitter having a known location, signal strength of a signal transmitted by a transmitter and received by a receiver at a known location, network timing measurements, round trip propagation time measurements, timing advance, time difference of arrival, the identification of a serving cell serving said mobile device, the identification of a serving sector serving said mobile device, a state of a wireless network serving said mobile device, and combinations thereof. In another embodiment, the storing of the data at the second node may only occur after the determination of the occurrence of the predetermined event. Of course, the data may be stored for a predetermined and/or configurable duration of time, such as, but not limited to, less than one minute.

An attempt at determining a location of the mobile device using a first location methodology may be conducted at step 230. In other embodiments of the present subject matter, step 230 may further comprise initially or concurrently attempting to determine a location of the mobile device using a first location methodology including GPS information or A-GPS information. Upon failure of the location attempt, mobile device data from the second node may be received at a third node of the network at step 240. An exemplary third node may be, but is not limited to, a SMLC or PDE. At step 250, an approximate location of the mobile device may then be determined at the third node using the mobile device data. In another embodiment of the present subject matter, the method may include, at step 260, sending the determined approximate location to a fourth node of the network.

Figure 3:
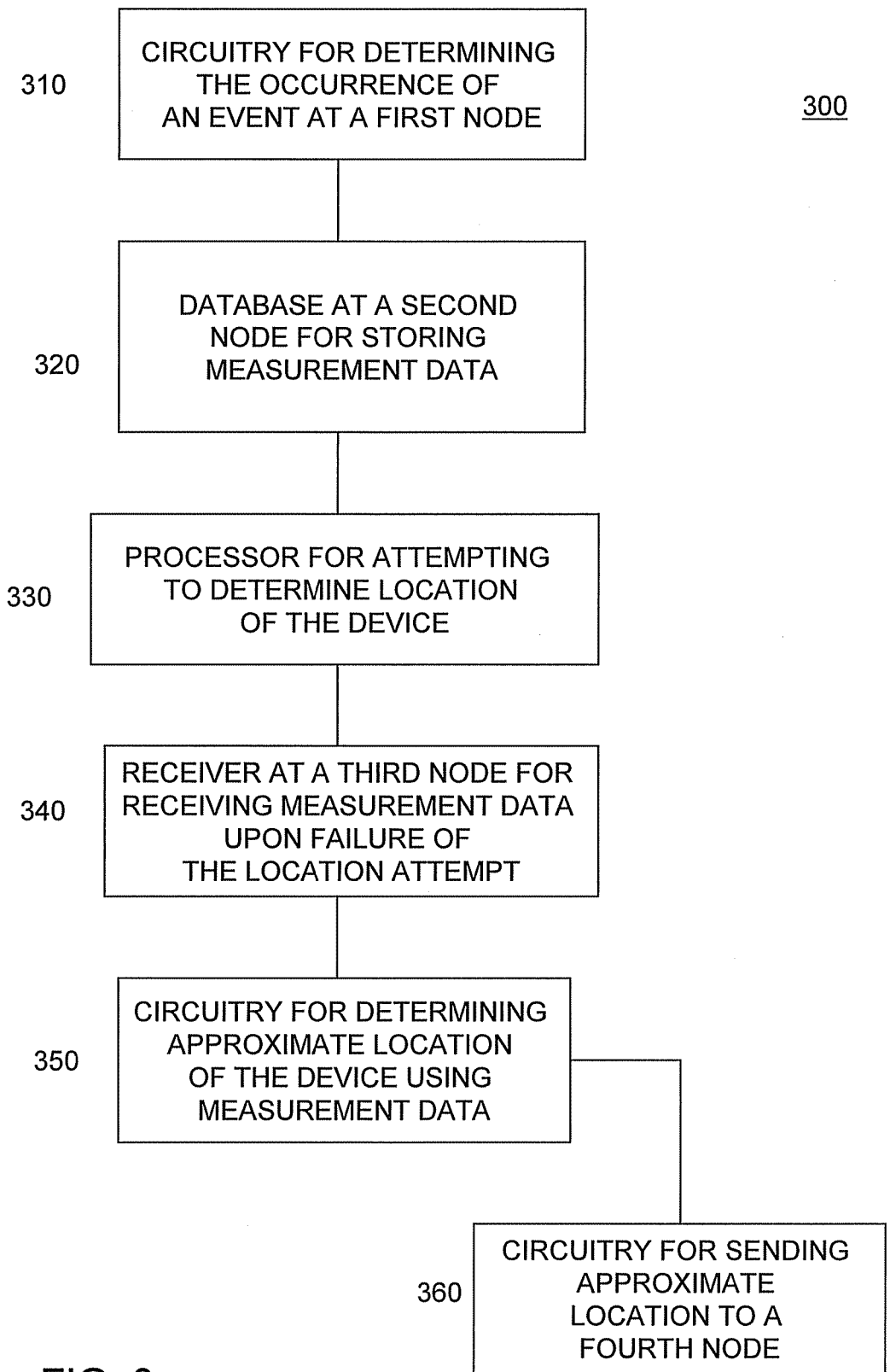
FIG. 3 is a block diagram of a system according to one embodiment of the present subject matter.

FIG. 3 is a block diagram of a system according to one embodiment of the present subject matter. With reference to FIG. 3, a system for determining an approximate location of a wireless device 300 is provided. The system may include, as represented by block 310, circuitry for determining at a first node of a network the occurrence of a predetermined event.

An exemplary communications network may be, but is not limited to, a wireless communication network such as a GSM network, iDEN, WiMAX Network, UMTS Network, CDMA 2000 Network, WiFi Network, and LTE Network. An exemplary first node may be, but is not limited to, a BSC, BTS, MSC, SMLC, PDE, and combinations thereof. An exemplary predetermined event may be, but is not limited to, an emergency call, a 911 call, a request for location of the mobile device, and combinations thereof.

As represented by block 320, the system may include a database at a second node of the network for storing data associated with the mobile device. An exemplary second node may be, but is not limited to, a BSC, BTS, MSC, SMLC, PDE, and combinations thereof. In one embodiment of the present subject matter, the first and second nodes may be the same. Exemplary data may include, by way of a non-limiting example, NMR information. By way of a further example, exemplary measurement data associated with the mobile device may include signal strength for a signal transmitted by a transmitter having a known location, signal strength of a signal transmitted by a transmitter and received by a receiver at a known location, network timing measurements, round trip propagation time measurements, timing advance, time difference of arrival, the identification of a serving cell serving said mobile device, the identification of a serving sector serving said mobile device, a state of a wireless network serving said mobile device, and combinations thereof. In another embodiment, the database at the second node may store the data only after the determination of the occurrence of the predetermined event. Of course, the data may be stored for a predetermined and/or configurable duration of time, such as, but not limited to, less than one minute.

The system may also include, as represented by block 330, a processor for attempting to determine a location of the mobile device. In other embodiments of the present subject matter, the processor may further comprise circuitry for initially or concurrently attempting to determine a location of the mobile device using a first location methodology including GPS information or A-GPS information. As represented by block 340, the system may include a receiver at a third node of the network for receiving the mobile device data from the second node upon failure of the location attempt. An exemplary third node may be, but is not limited to, a SMLC or PDE. The system may additionally include, at block 350, circuitry for determining at the third node an approximate location of the mobile device using the mobile device data. In another embodiment of the present subject matter, the system may include, as represented by block 360, circuitry for sending the determined approximate location to a fourth node of the network.

It is therefore an aspect of embodiments of the present subject matter to provide the benefit of a backup location mechanism with little or no communications infrastructure expansion. For example, the communications infrastructure between an SMLC and BSC may not have been originally designed to support high data rates that would be required if all NMR data for all mobile devices to be located were passed along this interface. Expansion of this infrastructure may be cost prohibitive given the network-wide implications, and the many network components affected; however, embodiments of the present subject matter may provide a backup location mechanism with little or no infrastructure expansion for such a communications infrastructure.

Another aspect of embodiments of the present subject matter may take advantage of the communications infrastructure already existing between the SMLC and BSC to serve the secondary purpose of supporting the transport of the NMR data for a backup location mechanism. Therefore, embodiments of the present subject matter would not require a new dedicated interface to be designed or developed between the BSC and SMLC, or between the BSC and PDE.

An additional aspect of embodiments of the present subject matter may thus provide a method to minimize implementation cost of a location system. It is also an aspect of embodiments of the present subject matter to provide a backup location system or a system providing a fairly low usage rate compared to the subscriber density of a communications network. It is yet another aspect of embodiments of the present subject matter to provide wireless carriers an opportunity to implement a secondary location mechanism with minimal incremental cost and complexity through an intelligent use of signaling and utilization of an existing communications infrastructure.

As shown by the various configurations and embodiments illustrated in FIGS. 1-3, a method and system for network measurement report caching for location of mobile devices have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method for determining an approximate location of a mobile device, comprising:
   (a) determining at a first node of a network an occurrence of a predetermined event;
   (b) storing at a second node of said network, measurement data associated with said mobile device as a result of the determined occurrence of a predetermined event;
   (c) attempting to determine a location of said mobile device using a first location methodology;
   (d) upon failure of said location attempt, receiving at a third node of said network said mobile device data from said second node; and
   (e) determining at said third node an approximate location of said mobile device using said mobile device data,
   wherein said measurement data includes Network Measurement Report ("NMR") information including calibration data.

2. The method of claim 1 further comprising:
   (f) sending said determined approximate location to a fourth node of said network.

3. The method of claim 1 wherein said first node is a base station controller ("BSC").

4. The method of claim 1 wherein said first node is selected from the group consisting of: base station controller ("BSC"), base transceiver station ("BTS"), mobile switching center ("MSC"), serving mobile location center ("SMLC"), position determining equipment ("PDE"), and combinations thereof.

5. The method of claim 1 wherein said network is a wireless communication network.

6. The method of claim 5 wherein said wireless communication network is selected from the group consisting of: Global System for Mobile communications ("GSM") network, Integrated Digital Enhanced Network ("iDEN"), Worldwide Interoperability for Microwave Access ("WiMAX") Network, Universal Mobile Telecommunication System ("UMTS") Network, Code Division Multiple Access ("CDMA") 2000 Network, WiFi Network, and Long Term Evolution ("LTE") Network.

7. The method of claim 1 wherein said predetermined event is an emergency call.

8. The method of claim 1 wherein said predetermined event is selected from the group consisting of: an emergency call, a 911 call, a request for location of said mobile device, and combinations thereof.

9. The method of claim 1 wherein said second node is a base station controller ("BSC").

10. The method of claim 1 wherein said second node is selected from the group consisting of: base station controller ("BSC"), base transceiver station ("BTS"), mobile switching center ("MSC"), serving mobile location center ("SMLC"), position determining equipment ("PDE"), and combinations thereof.

11. The method of claim 1 wherein said first node and said second node are the same.

12. The method of claim 1 wherein said storing of said data at said second node only occurs after said determination of the occurrence of said predetermined event.

13. The method of claim 12 wherein said data is stored for a predetermined duration of time.

14. The method of claim 13 wherein said duration of time is configurable.

15. The method of claim 13 wherein said predetermined duration of time is less than one minute.

16. The method of claim 1 wherein the step of attempting to determine a location further comprises initially attempting to determine a location of said mobile device using a first location methodology including Global Positioning System ("GPS") information or Assisted Global Positioning System ("A-GPS") information.

17. The method of claim 1 wherein the step of attempting to determine a location further comprises concurrently attempting to determine a location of said mobile device using a first location methodology including Global Positioning System ("GPS") information or Assisted Global Positioning System ("A-GPS") information.

18. The method of claim 1 wherein said third node is a serving mobile location center ("SMLC") or position determining equipment ("PDE").

19. The method of claim 1 wherein said measurement data associated with said mobile device is selected from the group consisting of: signal strength for a signal transmitted by a transmitter having a known location, signal strength of a signal transmitted by a transmitter and received by a receiver at a known location, network timing measurements, round trip propagation time measurements, timing advance, time difference of arrival, the identification of a serving cell serving said mobile device, the identification of a serving sector serving said mobile device, a state of a wireless network serving said mobile device, and combinations thereof.

20. A system for determining an approximate location of a mobile device, comprising:
- circuitry for determining at a first node of a network an occurrence of a predetermined event;
- a database at a second node of said network for storing data associated with said mobile device as a result of the determined occurrence of a predetermined event;
- a processor for attempting to determine a location of said mobile device;
- a receiver at a third node of said network for receiving said mobile device data from said second node upon failure of said location attempt; and
- circuitry for determining at said third node an approximate location of said mobile device using said mobile device data, wherein said data includes Network Measurement Report ("NMR") information including calibration data.

21. The system of claim 20 further comprising:
circuitry for sending said determined approximate location to a fourth node of said network.

22. The system of claim 20 wherein said first node is a base station controller ("BSC").

23. The system of claim 20 wherein said first node is selected from the group consisting of: base station controller ("BSC"), base transceiver station ("BTS"), mobile switching center ("MSC"), serving mobile location center ("SMLC"), position determining equipment ("PDE"), and combinations thereof.

24. The system of claim 20 wherein said network is a wireless communication network.

25. The system of claim 24 wherein said wireless communication network is selected from the group consisting of: Global System for Mobile communications ("GSM") network, Integrated Digital Enhanced Network ("iDEN"), Worldwide Interoperability for Microwave Access ("WiMAX") Network, Universal Mobile Telecommunication System ("UMTS") Network, Code Division Multiple Access ("CDMA") 2000 Network, WiFi Network, and Long Term Evolution ("LTE") Network.

26. The system of claim 20 wherein said predetermined event is an emergency call.

27. The system of claim 20 wherein said predetermined event is selected from the group consisting of: an emergency call, a 911 call, a request for location of said mobile device, and combinations thereof.

28. The system of claim 20 wherein said second node is a base station controller ("BSC").

29. The system of claim 20 wherein said second node is selected from the group consisting of: base station controller ("B SC"), base transceiver station ("BTS"), mobile switching center ("MSC"), serving mobile location center ("SMLC"), position determining equipment ("PDE"), and combinations thereof.

30. The system of claim 20 wherein said first node and said second node are the same.

31. The system of claim 20 wherein said database at said second node of said network stores said data associated with said mobile device only after said predetermined event is determined to have occurred.

32. The system of claim 31 wherein said data is stored for a predetermined duration of time.

33. The system of claim 32 wherein said duration of time is configurable.

34. The system of claim 32 wherein said predetermined duration of time is less than one minute.

35. The system of claim 20 wherein said processor initially attempts to determine the location of said mobile device using Global Positioning System ("GPS") information or Assisted Global Positioning System ("A-GPS") information.

36. The system of claim 20 wherein said third node is a serving mobile location center ("SMLC") or position determining equipment ("PDE").

37. The system of claim 20 wherein said processor concurrently attempts to determine the location of said mobile device using Global Positioning System ("GPS") information or Assisted Global Positioning System ("A-GPS") information.

38. The system of claim 20 wherein said measurement data associated with said mobile device is selected from the group consisting of: signal strength for a signal transmitted by a transmitter having a known location, signal strength of a signal transmitted by a transmitter and received by a receiver at a known location, network timing measurements, round trip propagation time measurements, timing advance, time difference of arrival, the identification of a serving cell serving said mobile device, the identification of a serving sector serving said mobile device, a state of a wireless network serving said mobile device, and combinations thereof.

* * * * *

(12) EX PARTE REEXAMINATION CERTIFICATE (9855th)
United States Patent
Carlson et al.

(10) Number: US 8,213,955 C1
(45) Certificate Issued: Sep. 23, 2013

(54) NETWORK MEASUREMENT REPORT CACHING FOR LOCATION OF MOBILE DEVICES

(75) Inventors: John P. Carlson, Dulles, VA (US); Martin Dawson, Wollongong (AU)

(73) Assignees: Commscope, Inc. of North Carolina, Hickory, NC (US); Andrew LLC, Hickory, NC (US)

Reexamination Request:
No. 90/012,765, Jan. 31, 2013

Reexamination Certificate for:
Patent No.: 8,213,955
Issued: Jul. 3, 2012
Appl. No.: 12/113,476
Filed: May 1, 2008

(51) Int. Cl.
*H04W 24/00* (2009.01)
*G06F 15/16* (2006.01)
*G01S 19/00* (2010.01)
*H04L 7/00* (2006.01)
*H04M 11/04* (2006.01)

(52) U.S. Cl.
USPC ............... 455/456.1; 342/357.2; 375/357; 455/404.2; 455/456.5; 709/230

(58) Field of Classification Search
None
See application file for complete search history.

(56) References Cited

To view the complete listing of prior art documents cited during the proceeding for Reexamination Control Number 90/012,765, please refer to the USPTO's public Patent Application Information Retrieval (PAIR) system under the Display References tab.

*Primary Examiner* — Charles Craver

(57) ABSTRACT

A system and method for determining an approximate location of a mobile device. The occurrence of a predetermined event may be determined at a first node of a network. Measurement data associated with the mobile device may be stored at a second node of the network. An attempt may be made to determine a location of the mobile device using a first location methodology. Upon failure of the location attempt, the mobile device data may be received at a third node of the network from the second node. At the third node an approximate location of the mobile device may be determined using the mobile device data.

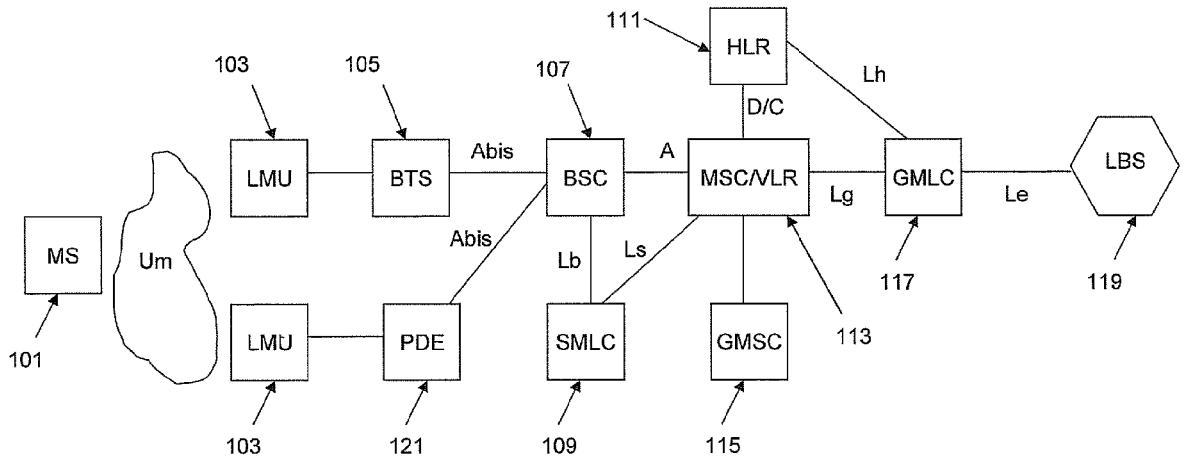

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12, 16-31 and 35-38 is confirmed.

Claims 13-15 and 32-34 were not reexamined.

\* \* \* \* \*